Jan. 24, 1933.  B. T. MORRISON  1,895,394
GAS ESCAPE WARNING DEVICE
Filed Sept. 6, 1932
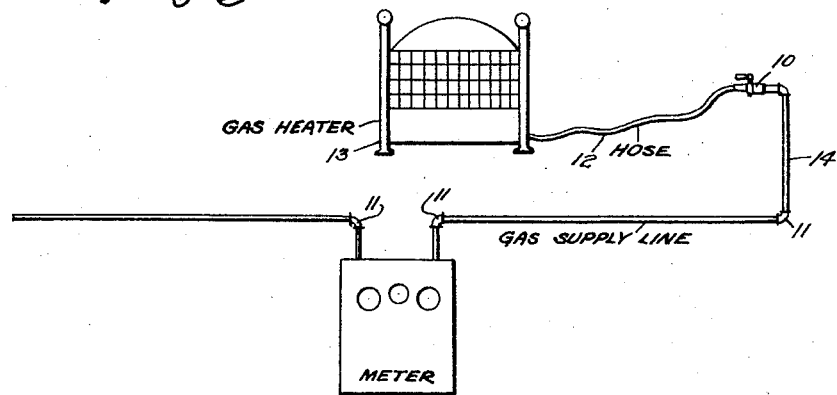
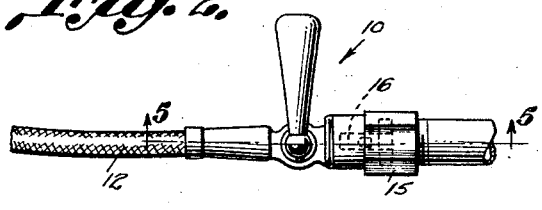
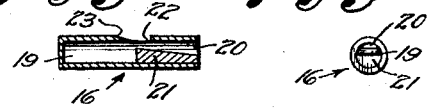
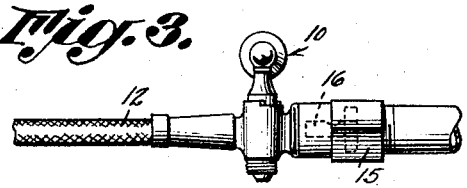
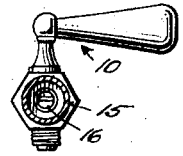
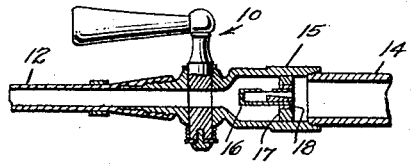
Inventor
*Boyce T. Morrison*
By *Miller & Miller*
Attorneys Patented Jan. 24, 1933

1,895,394

UNITED STATES PATENT OFFICE

BOYCE TURNER MORRISON, OF BEAUMONT, TEXAS

GAS ESCAPE WARNING DEVICE

Application filed September 6, 1932. Serial No. 631,915.

This invention relates to a gas escape warning device and has for an object to provide a device which may be placed in the gas line at a suitable place and which will give a warning sound of a piercing whistle if a leak or escape of gas should take place between the warning device and the object which is consuming the gas.

A further object of this invention is to provide a gas escape warning device which will consist of a whistle which may be placed in the gas line such as in a shut-off valve or in an L in the gas line.

Yet an additional object of this invention is to provide a gas escape warning device consisting of a whistle placed in the gas line, which whistle will be inoperative so long as there is back pressure created by the orderly consumption of the gas or the closing of the valve, but which will give a warning sound of a piercing whistle should the gas pass therethrough at excessive speed due to a leak having developed further on in the gas line.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a diagrammatic view showing this invention connected with an ordinary gas heater, Figure 2 is a top plan view of the gas valve showing the whistle in dotted lines, Figure 3 is a front elevation of same, Figure 4 is an end view of the valve showing whistle therein, Figure 5 is a sectional view taken on line 5—5 of Figure 2, the valve being shown in open position, Figure 6 is an enlarged sectional view of the whistle, Figure 7 is an enlarged end view of same, and Figure 8 is a modification of this invention showing the whistle device embodied in an L.

There is shown at 10 a stop valve and at 11 a connecting L to each of which this invention has been applied. The stop or shut-off valve 10 has at one side thereof a flexible hose 12 leading to a gas consuming appliance such as a gas heater 13. Similarly, any other type of hose or conduit may be placed between the stop or shut-off valve 10 and any type of gas consuming apparatus.

The other side of the shut-off valve 10 is connected to a gas supply line 14, the end of the supply line 14 being threaded into an enlarged chamber 15 of the shut-off valve 10. Mounted within the chamber 15 of the shut-off valve 10 is the whistle 16 by means of an internal apertured flange 17. A washer 18 of rubber or the like may be placed within the internal flange 17 to secure the whistle 16 therein and thereby force all the gas passing through the chamber 15 to first pass through the whistle 16.

The whistle 16 includes a whistle chamber 19 closed at one end and having a gas entrance 20 at the other end partly obstructed by a sloping or inclined block 21. An exit 22 is provided in the whistle chamber 19 for the gas passing therethrough, the edge of the exit 22 further from the entrance 20 being very sharp as shown at 23.

In operation, the warning whistle 16 may be placed not only in the chamber 15 of the shut-off or stop valve 10, but may likewise be placed in deep L 11 as shown in Figure 8, an internal apertured flange 25 being provided in the L 11 for mounting the whistle 16 therein in the same manner that it is mounted in the flange 17 in the chamber 15 of the shut-off valve 10.

In operation, the warning whistle 16 permits the gas to flow freely therethrough without making a whistling sound so long as there is no substantial difference in pressure of gas on opposite sides of the whistle 16. When the gas is being consumed in a gas appliance, such as the gas heater 13, in an orderly manner, the pressure on the hose side of the open shut-off valve 10 will not be much lower than the pressure on the gas supply line side of the shut-off valve 10, and the whistle will remain silent as the gas passes therethrough. Should the hose 12 leak or become loose from either the gas heater or the shut-off valve then the pressure on this side will drop as the gas escapes freely into the household or surrounding region, thus creating a substantial difference in pressure on opposite sides of the whistle 16. As the gas passes through the whistle 16 with a substantial difference in pressure a warning sound consisting of a piercing whistle will be given off by the whistle 16, this sound being such as could be heard over an entire house and thus give warning of escaping gas and allowing the same to be remedied. If there is no needle valve present in the gas heater or gas appliance consuming the gas, then this whistle will also operate should the gas be accidentally left on without any flame, but if a needle valve is used, the needle valve will create sufficient back pressure to make this whistle inoperative except in the case of a leak between the needle valve and the whistle.

In the same way, as already described, the whistle 16 is provided in each of the L's 11 throughout the gas supply line and in case of a leak developing anywhere along the gas supply line, the whistle in the adjacent L through which the gas is passing will operate to give a warning sound in warning the occupants of the house that gas is escaping and thereby causing them to take precautions against the dangers caused by escaping gas.

The novel features and the operation of this device will be apparent from the foregoing description. While the device has been shown and the structure described in detail, it is obvious that this is not to be considered limited to the exact form disclosed, and that changes may be made therein within the scope of what is claimed, without departing from the spirit of the invention.

Having thus set forth and disclosed the nature of this invention, what is claimed is:

1. A gas escape warning device comprising a gas supply line, an L connection in said supply line, a whistle, and means for mounting said whistle in said L connection whereby the entire gas supply passes through said whistle and operates said whistle when the pressure on one side thereof is substantially in excess of the pressure on the other side thereof, said mounting means comprising an internal apertured flange in said L connection.

2. A gas escape detector comprising a gas supply line, a plurality of L connections in said gas supply line, and a whistle mounted in each L connection whereby the entire gas supply passes through said whistle and operates the same when the pressure of the gas supply on one side of said L connection is substantially in excess of the pressure of the gas on the other side of said L connection.

3. A gas escape detector comprising a gas line connection, a whistle, and means for mounting said whistle in said gas line connection whereby the entire gas supply passes through said whistle and operates said whistle when the pressure on one side thereof is substantially in excess of the pressure on the other side thereof, said mounting means comprising an internally apertured flange in said gas line connection.

4. A combination gas supply line valve and gas escaping detector comprising a shut off valve, a chamber in said shut off valve, an internally apertured flange in said chamber, and a whistle mounted in said internally apertured flange whereby the entire gas supply passes through said whistle.

5. A combination gas supply line connection and gas escape detector comprising a gas supply line connection, a chamber in said gas supply line connection, an internally apertured flange in said chamber, and a whistle mounted in said internally apertured flange whereby the entire gas supply passes through said whistle.

In testimony whereof I affix my signature.

BOYCE TURNER MORRISON.